Sept. 15, 1970 R. B. HOSKING ET AL 3,529,096
ANNOYANCE CALL HOLDING DEVICE
Filed Jan. 29, 1968
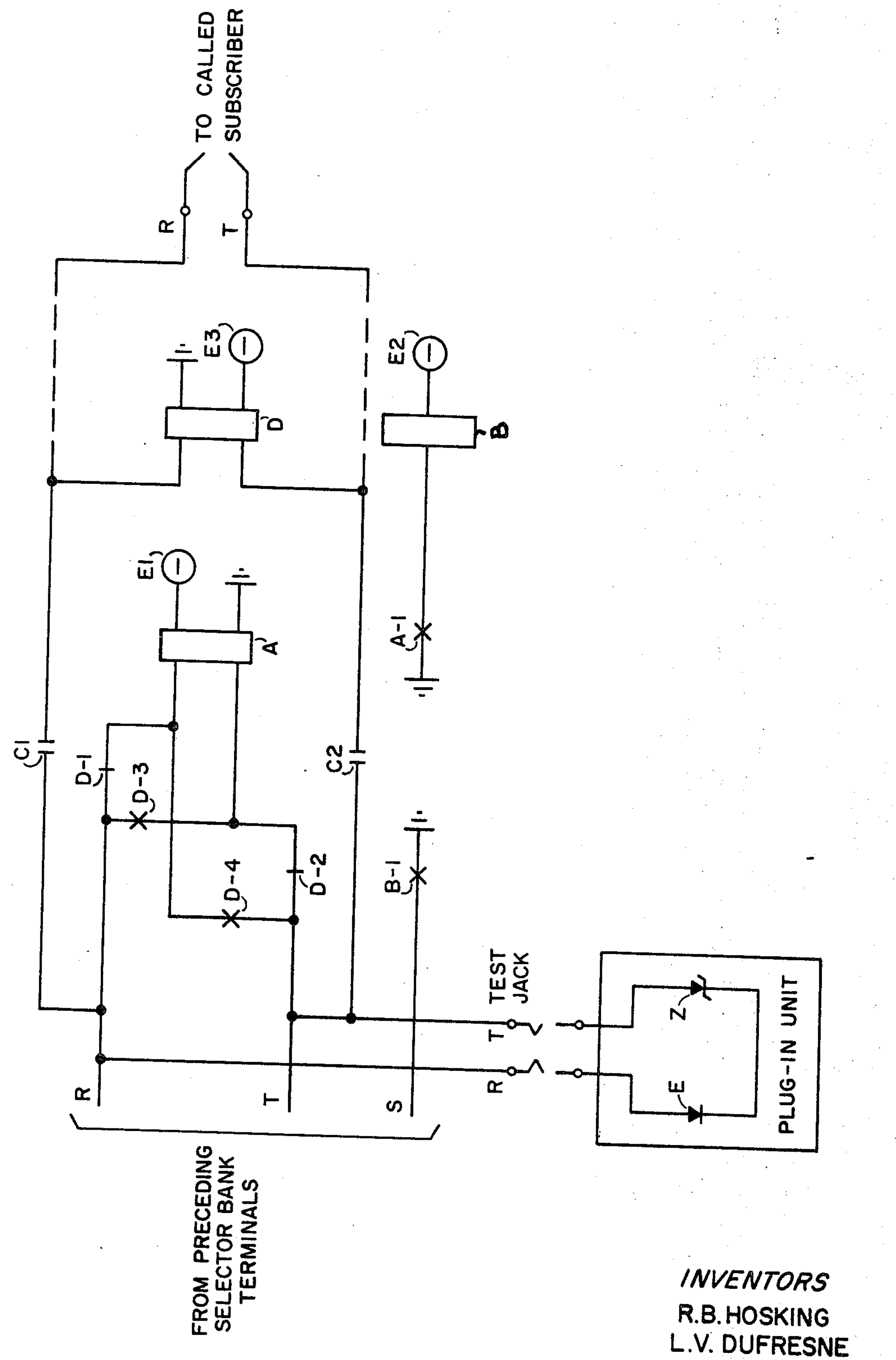
*INVENTORS*
R.B. HOSKING
L.V. DUFRESNE
AGENTS
Curphey & Erickson 3,529,096

ANNOYANCE CALL HOLDING DEVICE

Ronald Benjamin Hosking, Baie D'Urfe, Quebec, and Lionel V. Dufresne, Montreal, Quebec, Canada, assignors to The Bell Telephone Co. of Canada, Montreal, Quebec, Canada Filed Jan. 29, 1968, Ser. No. 701,266
Int. Cl. H04m 3/42
U.S. Cl. 179—18 5 Claims

ABSTRACT OF THE DISCLOSURE

A call control circuit for use with step-by-step telephone switching systems to enable tracing an annoyance call by transferring control of the call from the calling subscriber to the called subscriber. The circuit consists of a Zener diode in series with a conventional diode connected across the calling subscriber's loop at the called subscriber's connector to hold the connection even if the calling subscriber hangs up and to maintain the connection until the called subscriber hangs up.

This invention relates to a circuit for use in a step-by-step telephone switching system for transferring the control of a call from the calling subscriber to the called subscriber.

Telephone circuits in a step-by-step telephone switching system employing step-by-step connectors are usually caller controlled and when the calling subscriber hangs up his telephone, the dialed connection is broken. However, in the case of annoyance calls, it would be desirable for the annoyed subscriber to be able to hold the dialed connection until the call has been traced back to the calling number.

It is, therefore, the main feature of the invention to provide a circuit for connection to the step-by-step connector which will permit the called subscriber to hold the dialed connection for the purpose of tracing an annoyance call.

In accordance with the invention, the conventional step-by-step connector, which has a potential source responsive to closure of a calling subscriber's loop for applying a potential to the loop, means responsive to the potential applied for holding a train of switches between the calling subscriber's loop and the connector, and means responsive to answering of the call by the called subscriber for reversing the potential applied to the calling subscriber's loop, is equipped with a circuit which is responsive to the potential reversal on the calling subscriber's loop for holding the train of switches after opening of the calling subscriber's loop until the called subscriber releases, thus effectively transferring control of the call from the calling subscriber to the called subscriber.

The hold device comprises a Zener diode connected across the subscriber's loop and adapted to become conductive upon opening of the calling subscriber's loop.

The invention will now be described with reference to a preferred embodiment of the invention which is illustrated in the enclosed drawing, such embodiment being only for illustration purposes and being in no way restrictive of the invention.

The drawing illustrates part of a conventional step-by-step connector which is adapted for connection to preceding selector bank terminals by the known tip, ring and sleeve leads T, R and S respectively. A source of potential E1 is applied to the tip and ring leads through the energizing winding of a relay A and the contacts D–1, D–2, D–3 and D–4 of a relay D, contacts D–1 and D–2 being normally closed and contacts D–3 and D–4 being normally open.

The sleeve lead S is connected to ground through the normally open contacts B–1 of a relay B. Relay B has one terminal connected to a negative potential source E2 and the other terminal connected to ground through contacts A–1 of relay A.

A pair of capacitors C1 and C2 isolates the calling and called subscribers for D–C transmission. Relay D is connected to a potential source E3 and is energized when the called subscriber answers the phone thus bridging the tip and ring leads T and R, respectively.

As commonly known in the step-by-step telephone art, dialing of the requested telephone number extends the calling subscriber's loop through a train of switches (not shown) to a connector associated with the called subscriber's telephone and operates relay A of that connector through normally closed contacts D–1 and D–2 of relay D. Operation of relay A closes contacts A–1 and energizes relay B. Energization of relay B puts a ground on the sleeve lead S to hold the preceding switches in the train as it is well known in the art.

Before the called party answers, the tip lead T back to the calling subscriber is at ground potential and the ring lead R is at negative potential. When the called party answers, relay D operates and reverses this arrangement. It puts a negative potential on the tip lead T and ground on the ring lead R. This reversal of battery, as it is called, serves as a signal that the called party has answered.

The description and operation of the switch so far described, is conventional. Coming now to the invention, test leads are extended from the tip and ring leads of the connector switch to a pair of test jacks positioned at an accessible test point. The circuit of the invention, in the form of a plug-in device or unit comprising a diode E and a Zener diode Z is provided with a pair of plugs for insertion into the test jacks. The cathodes of diode E and Zener diode Z are connected together. The anode of diode E is adapted for connection to the ring lead R and the anode of the Zener diode Z to the tip lead T.

Diode E may be of any type but it should have a steep forward voltage current characteristic with a sharp forward knee. In addition, it should be able to withstand voltage peaks of up to 200 volts in the reverse direction.

Before relay D is energized, diode E is reverse biased and there is no current conduction through diode E and Zener diode Z. When relay D is energized, the polarity of the potential applied to leads T and R is reversed by the opening of contacts D–1 and D–2 and the closure of contacts D–3 and D–4. Diode E will now conduct but Zener diode Z is chosen so that its breakdown voltage is not exceeded because of the voltage drop across the calling subscriber and consequently does not conduct. For example, with a connector having a voltage E1 of 48 volts, a relay A resistance of 400 ohms, and a loop resistance of approximately 1200 ohms, a Zener diode having a breakdown voltage of 38–40 volts will be satisfactory. With the above component values, the voltage across Zener diode Z would be about 36 volts.

An important feature of the circuit, in accordance with the invention, is that it has negligible transmission loss due to the fact that Zener diode Z is not conducting in the talking state of a call.

If an annoyance call is encountered, the called subscriber merely leaves his receiver off the hook and using another telephone set informs the telephone company. If during this time the calling subscriber releases, the potential drop is removed from the connector relay A and the voltage applied to the Zener diode Z will increase above its breakdown value. The Zener diode Z will then conduct and hold relay A energized despite the fact that the bridge across the tip and ring leads at the calling subscriber is opened. The connector relay A will hold the train of switches until the telephone company removes the plug-in unit after having traced the annoyance call. The removal of the plug-in unit will deenergize relay A and release the switch train.

The connector may also be released by the called subscriber when he hangs up his telephone set. At such a time, relay D will be deenergized and revert the polarity of the voltage across the calling subscriber's line back to normal. Diode E will then prevent conduction through the plug-in unit.

What is claimed is:

1. A call control transfer circuit for use with a step-by-step connector switch having a potential source for applying a potential to a calling subscriber's loop in response to closure of the loop by the subscriber, a first means responsive to the potential applied for holding a train of switches between the calling subscriber and the connector, and a second means responsive to answering of the call by the called subscriber for reversing the potential applied to the calling subscriber's loop, said circuit being connectable across said loop and comprising;

first control means conditioned by said reversing of the potential and responsive to an increase in potential when the calling subscriber opens said loop for holding said train of switches until the called subscriber releases, and second control means preventing conduction through said circuit prior to said reversing of the potential.

2. A call control transfer circuit as defined in claim 1 wherein said first control means is a Zener diode rendered conductive by said increase in potential.

3. A call control transfer circuit as defined in claim 2 wherein said first means comprises a first relay connected across said potential source, said relay being maintained energized by said Zener diode when conductive.

4. A call control transfer circuit as defined in claim 2 wherein said second control means is a diode in series with the Zener diode, said diode being reverse biased by the potential source for preventing forward conduction through the Zener diode until reversal of the potential applied to said loop.

5. A call control transfer circuit as defined in claim 3 wherein said second control means is a diode in series with the Zener diode, said diode being reverse biased by the potential source for preventing forward conduction through the Zener diode until reversal of the potential applied to said loop.

References Cited

UNITED STATES PATENTS 3,015,698 1/1962 Pedrick.
3,137,770 6/1964 Doyle.
3,147,344 9/1964 Maxfield.

KATHLEEN H. CLAFFY, Primary Examiner

W. A. HELVESTINE, Assistant Examiner